United States Patent
Healey et al.

(10) Patent No.: US 11,198,400 B2
(45) Date of Patent: Dec. 14, 2021

(54) LANE DEPARTURE WARNING SYSTEM

(71) Applicant: ILLINOIS TOOL WORKS INC., Glenview, IL (US)

(72) Inventors: John Healey, Naperville, IL (US); Edward F. Bulgajewski, Genoa, IL (US); Piotr Sliwa, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 54 days.

(21) Appl. No.: 16/767,954

(22) PCT Filed: Nov. 30, 2018

(86) PCT No.: PCT/US2018/063358
§ 371 (c)(1),
(2) Date: May 28, 2020

(87) PCT Pub. No.: WO2019/108964
PCT Pub. Date: Jun. 6, 2019

(65) Prior Publication Data
US 2020/0369219 A1 Nov. 26, 2020

Related U.S. Application Data

(60) Provisional application No. 62/593,315, filed on Dec. 1, 2017.

(51) Int. Cl.
*B60R 11/04* (2006.01)
*H04N 5/225* (2006.01)
(Continued)

(52) U.S. Cl.
CPC ............... *B60R 11/04* (2013.01); *B60S 1/023* (2013.01); *G08G 1/167* (2013.01);
(Continued)

(58) Field of Classification Search
CPC ............ B60R 11/04; B60R 2011/0077; B60R 2011/0026; H04N 5/22521; H04N 5/2253; B60S 1/023; G08G 1/167
See application file for complete search history.

(56) References Cited

U.S. PATENT DOCUMENTS

2011/0233248 A1* 9/2011 Flemming ............... B60R 11/02
224/482
2017/0070651 A1 3/2017 Hacker et al.

FOREIGN PATENT DOCUMENTS

EP 3228508 A1 10/2017
WO 2017/151348 A1 9/2017

OTHER PUBLICATIONS

International Search Report and Written Opinion for PCT/US2018/063358, dated Mar. 21, 2019.

* cited by examiner

*Primary Examiner* — James M Pontius
(74) *Attorney, Agent, or Firm* — Quarles & Brady LLP

(57) ABSTRACT

A lane departure warning system is configured to be securely coupled to a portion of a vehicle. The lane departure warning system includes a bracket that is configured to securely retain a camera assembly, and a securing adhesive pad attachable to the bracket. The securing adhesive pad includes a substrate, a first adhesive layer on a first side of the substrate that is configured to secure the securing adhesive pad to the bracket, and a second adhesive layer on a second side of the substrate that is configured to secure the lane departure warning system to the vehicle.

18 Claims, 8 Drawing Sheets

(51) Int. Cl.
    *B60S 1/02*         (2006.01)
    *G08G 1/16*        (2006.01)
    *B60R 11/00*      (2006.01)

(52) U.S. Cl.
    CPC ....... *H04N 5/2253* (2013.01); *H04N 5/22521* (2018.08); *B60R 2011/0077* (2013.01)

LANE DEPARTURE WARNING SYSTEM

CROSS-REFERENCE TO RELATED APPLICATIONS

The present application represents the United States National Stage of International Application No. PCT/US2018/063358, filed Nov. 30, 2018, is based on, claims priority to, and incorporates herein in its entirety U.S. Provisional Application No. 62/593,315, filed Dec. 1, 2017, and entitled "Lane Departure Warning System."

FIELD OF THE DISCLOSURE

Embodiments of the present disclosure generally relate to a lane departure warning assembly, such as used with vehicles, and more particularly, to a lane departure warning assembly including a heater coupled to a bracket that retains a camera.

BACKGROUND

Various motor vehicles (such as automobiles) include one or more lane departure warning systems. For instance, some systems include cameras that are used to detect the vehicle's position within the lane on a road. The cameras communicate with a processing system that can alert a driver when the vehicle veers, or begins to veer, out of a lane.

Common lane departure warning systems include a mounting bracket that secures a camera module to the inside surface of the vehicle's windshield. The bracket is typically affixed to the windshield using a continuous bead of liquid-dispensed polyurethane or other such adhesives. The process of securing the bracket to the windshield often requires a pretreatment of a primer to be applied to the bracket and/or the surface of the windshield. Once the bracket is positioned on the windshield, a specified dwell time is also required to cure the adhesive to ensure a secure coupling to the windshield. Therefore, current methods for installing lane departure warning systems can be cumbersome and time consuming.

SUMMARY

The present disclosure provides a lane departure warning system that overcomes the shortcomings of current technologies.

In accordance with one aspect of the present disclosure, a lane departure warning system that is configured to be securely coupled to a portion of a vehicle is provided. The lane departure warning system includes a bracket that is configured to securely retain a camera assembly. The lane departure warning system further includes a securing adhesive pad attachable to the bracket, and configured to securely couple the lane departure warning system to the portion of the vehicle. The lane departure warning system also includes a heater that is attached to the securing adhesive pad, and configured to provide heat to at least a portion of the lane departure warning system or the portion of the vehicle.

In accordance with another aspect of the present disclosure, a lane departure warning system that is configured to be securely coupled to a portion of a vehicle is provided. The lane departure warning system includes a bracket that is configured to securely retain a camera assembly. The lane departure warning system further includes a securing adhesive pad attachable to the bracket. The securing adhesive pad includes a substrate, a first adhesive layer on a first side of the substrate that is configured to secure the securing adhesive pad to the bracket, and a second adhesive layer on a second side of the substrate that is configured to secure the lane departure warning system to the vehicle.

BRIEF DESCRIPTION OF THE DRAWINGS

Other features and advantages of the invention will become apparent to those skilled in the art upon review of the following detailed description, claims, and drawings in which like numerals are used to designate like features.

DETAILED DESCRIPTION OF EMBODIMENTS OF THE DISCLOSURE

Figure 1:
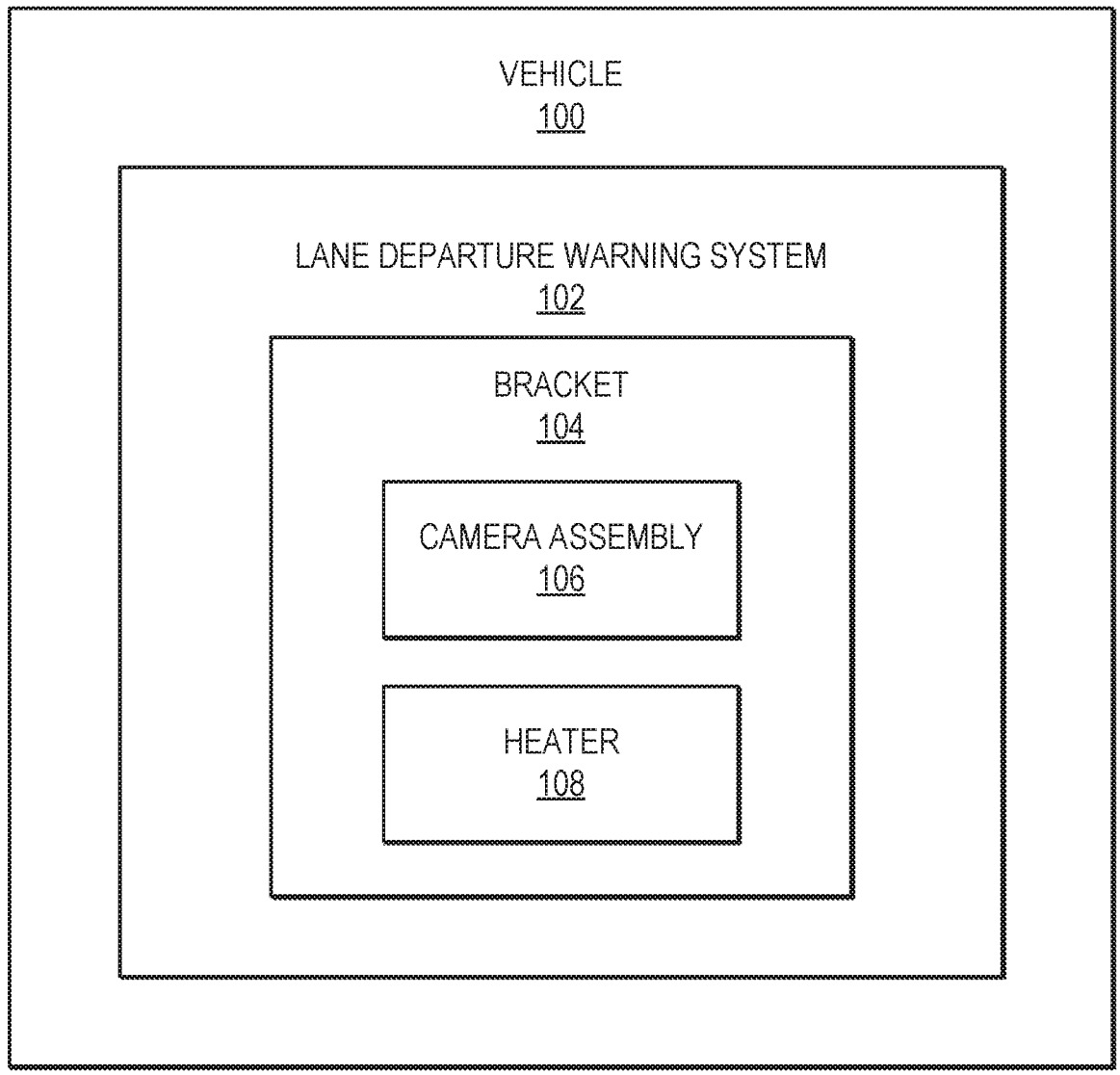
FIG. 1 illustrates a schematic block diagram of an example vehicle that includes a lane departure warning system, in accordance with aspects of the present disclosure.

FIG. 1 illustrates a schematic block diagram of an example vehicle 100 that includes a lane departure warning system 102, in accordance with aspects of the present disclosure. In some arrangements, the lane departure warning system 102 may be positioned on the windshield or elsewhere on the vehicle 100. In addition, the lane departure warning system 102 may be in communication with various circuitry and hardware on the vehicle 100, such as the vehicle's battery, vehicle's electronic control unit(s), vehicle's computer(s), vehicle's onboard navigation unit(s), vehicle's sensor(s), and so on. In this manner, the lane departure warning system 102 may receive power from the vehicle 100, as well as exchange various electronic signals, data, and information with a variety of vehicle hardware.

The lane departure warning system 102 includes a bracket 104 that is configured to retain a camera assembly 106 and other components of the lane departure warning system 102. The bracket 104 may be configured to secure the lane departure warning system 102 to a surface or a portion of the vehicle. For instance, the bracket 104 may be configured to secure the lane departure warning system 102 to the windshield of the vehicle 100. In some embodiments, the bracket 104 may also include a heater 108 configured to provide heat to at least a portion of the bracket 104 and/or its surrounding environment. For instance, the heater 108 may be configured to reduce or eliminate moisture or frost from a windshield or a camera lens.

Figure 2:
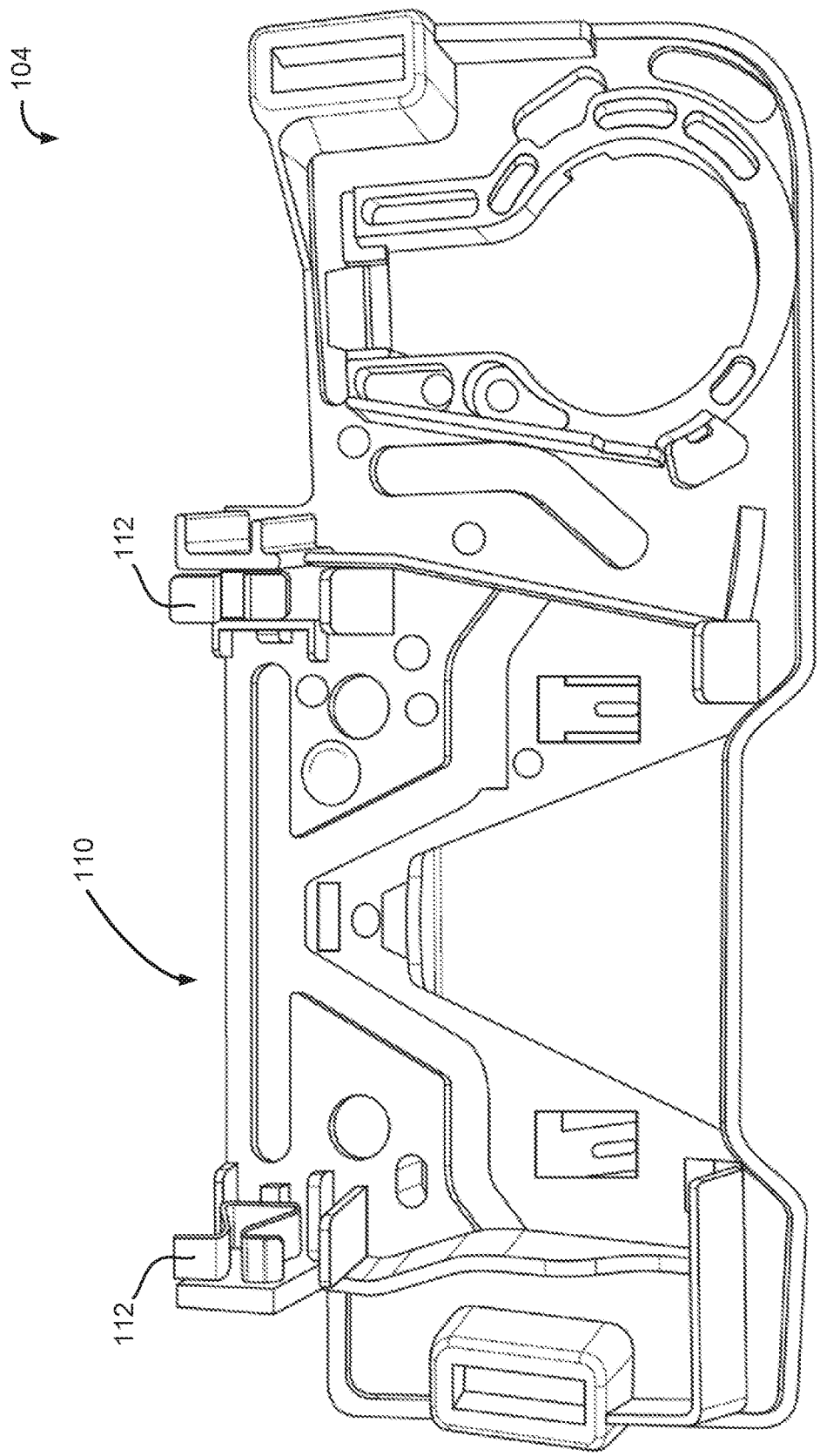
FIG. 2 illustrates a perspective rear view of a bracket, in accordance with aspects of the present disclosure.

Referring particularly to FIG. 2, a rear view of an example bracket 104, in accordance with aspects of the present disclosure, is illustrated. As shown, the rear side of the bracket 104 may include a retention area 110 configured to fit and hold a camera assembly 106 (not shown). In some embodiments, the retention area 110 may be defined using specific features formed in the bracket 104, such as various retention guides, walls, posts, or grooves. As shown in FIG. 2, the bracket 104 may include clips 112 that are configured to engage at least a portion of the camera assembly 106, and couple it to the bracket 104. However, various other fasteners or fastening means may be utilized to secure the camera assembly 106 to the bracket 104. For example, various screws, pins, anchors, and so forth, may be used. Advantageously, such fastening means may be configured to provide easy access and quick-release of the camera assembly 106, as necessary.

Figure 3:
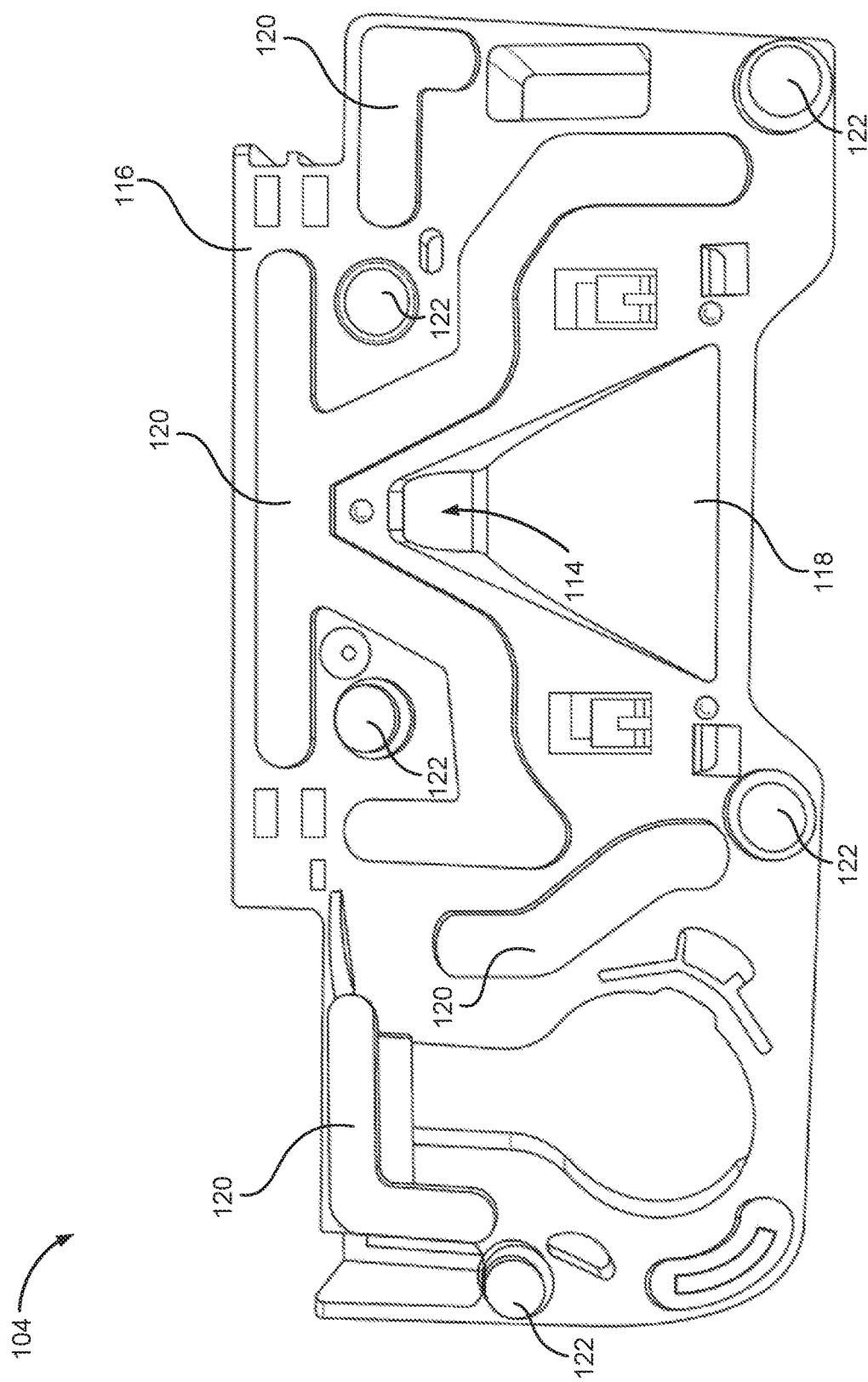
FIG. 3 illustrates a perspective front view of the bracket of FIG. 2.

A front view of the bracket 104 is illustrated in FIG. 3. Among other features, the bracket 104 may include an opening 114 that extends between and connects the front and rear of the bracket 104. The opening 114 may have any shape and dimensions, depending upon the particular configuration of the camera assembly 106. In some non-limiting examples, the opening 114 may be circular, rectangular, triangular, or oval. In some embodiments, the opening 114 may be recessed from the front surface 116 of the bracket 104 and lead into at least one expanding inclined plane 118 formed in the front surface 116 of the bracket 104, as shown in FIG. 3. The angle of the expanding inclined plane(s) 118 relative to the front surface 116 of the bracket 104 may be in a range between approximately 5° and approximately 45° and may depend on the surface of the vehicle to which the bracket 104 is attached. Together, the opening 114 and expanding inclined plane(s) 118 provide a field-of-view, or line of sight access, for a camera positioned on the rear side of the bracket 104.

As shown in FIG. 3, in some implementations, the front side of the bracket 104 may include one or more elevated surfaces 120, which protrude away from the front surface 116 of the bracket 104. Such elevated surfaces 120 may provide a number of securing regions or locations to which an adhesive may adhere. In addition, the front surface 116 of the bracket 104 may also include a number of bumpers 122. Alternatively, the bracket 104 may exclude the elevated surfaces 120 and/or bumpers 122 and allow an adhesive to come in direct contact with the front surface 116 of the bracket 104. Such implementations could reduce manufacturing costs of the bracket 104.

Figure 4:
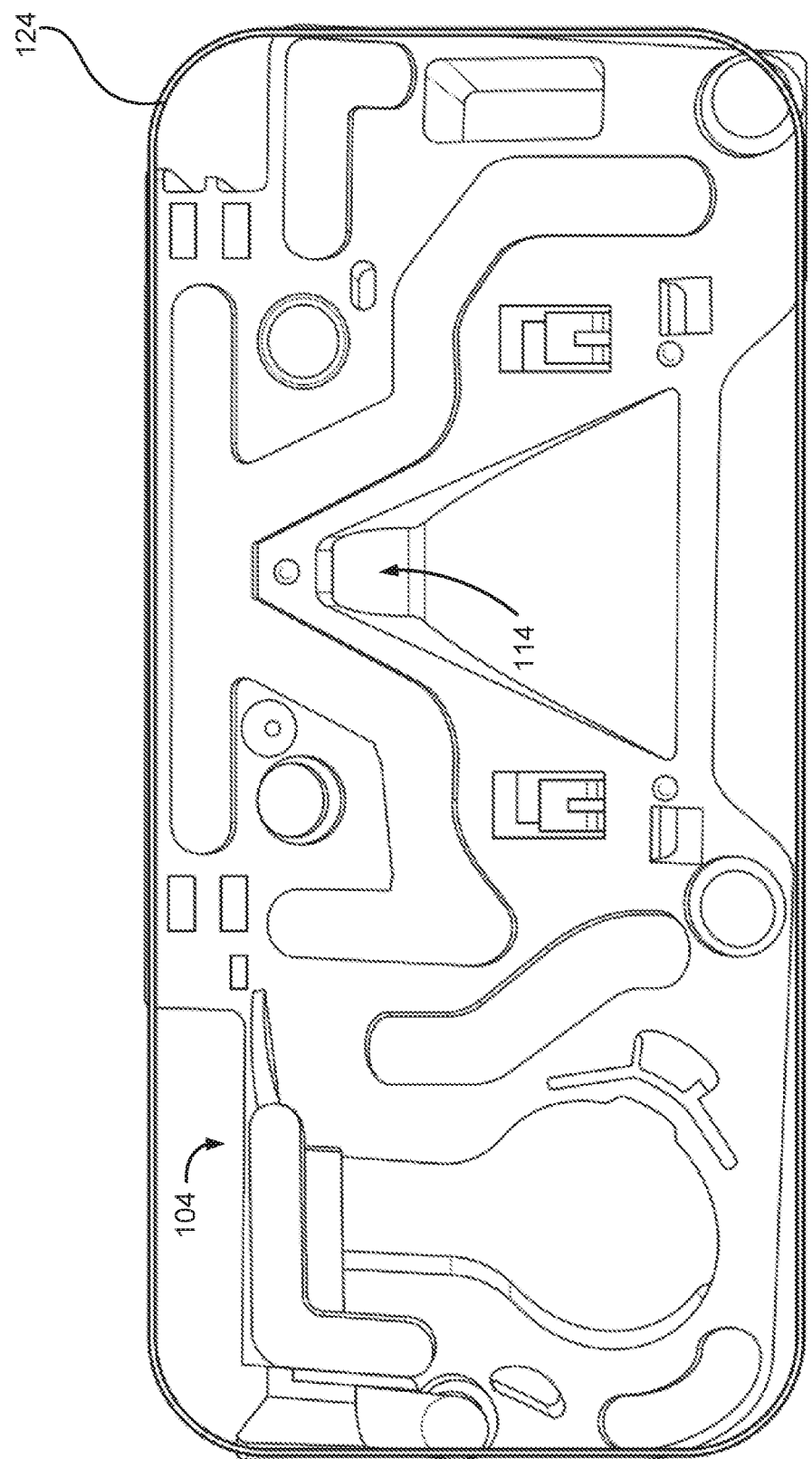
FIG. 4 illustrates another perspective front view of the bracket of FIG. 2.
Figure 5B:
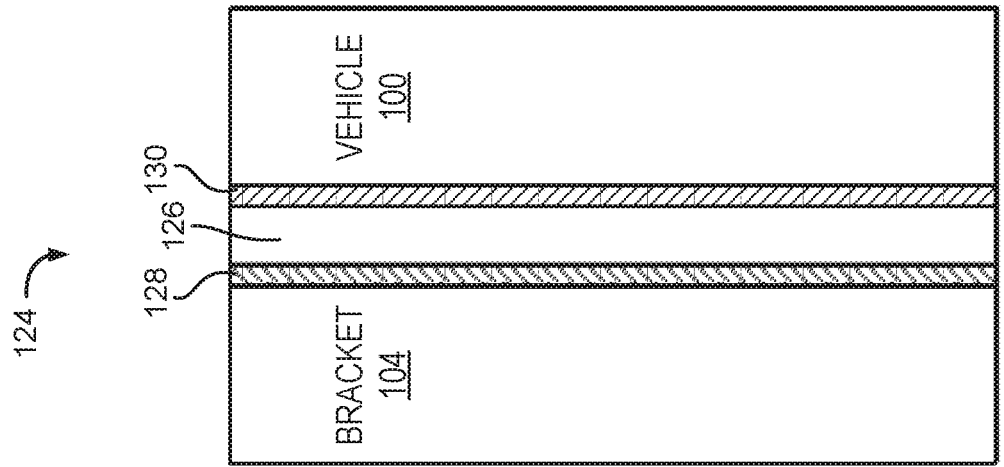
FIG. 5B illustrates a cross-sectional view showing the adhesive securing pad of FIG. 5A when attached to the bracket and vehicle surface.
Figure 5A:
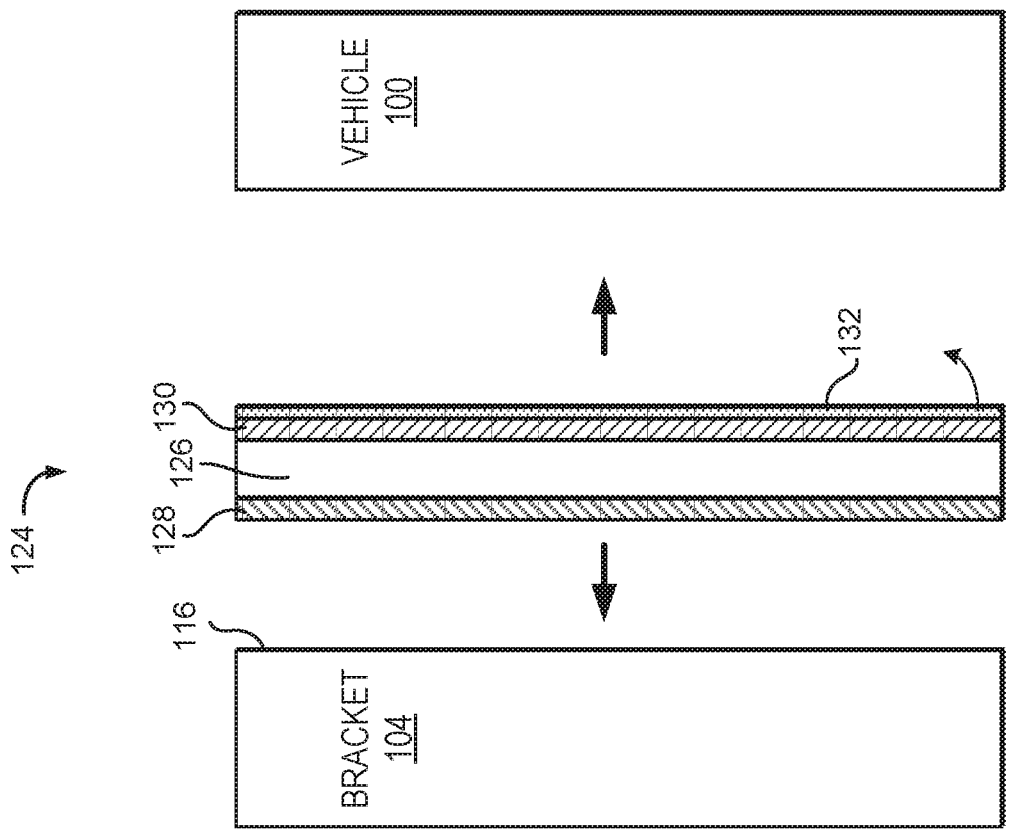
FIG. 5A illustrates a cross-sectional view of a bracket, adhesive securing pad, and an example vehicle surface, in accordance with aspects of the present disclosure.

To secure the lane departure warning system 102 to the vehicle 100, the lane departure warning system 102 may include an adhesive securing pad 124 attached to the front surface 116 of the bracket 104, as shown in FIGS. 4 and 5A-B. Referring specifically to FIG. 5A, the adhesive securing pad 124 may include a substrate 126 having a first adhesive layer 128 on a first side of the adhesive securing pad 124 that is proximate to the front surface 116 of the bracket 104. The adhesive securing pad 124 may also include a second adhesive layer 130 on a second side of the adhesive securing pad 124 that is distal to the front surface 116 of the bracket 104. When positioned and pressed together, the first adhesive layer 128 makes contact with the front surface 116 of the bracket 104. In some alternative designs of the bracket 104, as described with reference to FIG. 3, the first adhesive layer 128 may make contact with one or more elevated surface(s) 120 or other securing areas of the bracket 104. In either case, the first adhesive layer 128 need not extend over the entire surface area of the substrate 126 in order to prevent unwanted contact of the first adhesive layer 128 on the bracket 104.

The adhesive securing pad 124 may utilize various solvent-based adhesives, polymer dispersion adhesives, pressure-sensitive adhesives, contact adhesives, hot adhesives, multi-component adhesives, and so on. In one non-limiting example, the first adhesive layer 128 may utilize a very high bond adhesive (e.g. polyurethane), while the second adhesive layer 130 may include a pressure-sensitive adhesive (e.g. double-sided acrylic tape). As such, the second adhesive layer 130 may include a protective layer 132, which may be peeled away prior to use (FIG. 5A). Once peeled, the bracket 104 and securing pad 124 may be applied to a surface of the vehicle 100 (e.g. a windshield) and secured thereon by the second adhesive layer 130.

The substrate 126 may be formed using a variety of materials, such as various plastics, resins, and other materials. The substrate 126 may be rigid, semi-rigid, or flexible. In one non-limiting example, the substrate includes Mylar. The substrate 126 need not correspond to or cover the entire surface of the bracket 104, as shown in FIG. 4, and may have various shapes and dimensions, depending on the design and functionality of the bracket 104. In addition, the substrate 126 need not cover the opening 114 of the bracket 104 in order to prevent obstruction of the camera's field of view. Alternatively, the substrate 124 may be manufactured using a material that is substantially transparent to the light captured by the camera. In some embodiments, the substrate 104 may have a thickness in a range between approximately 0.5 mm and approximately 1 cm, although other thicknesses may be possible.

Figure 6:
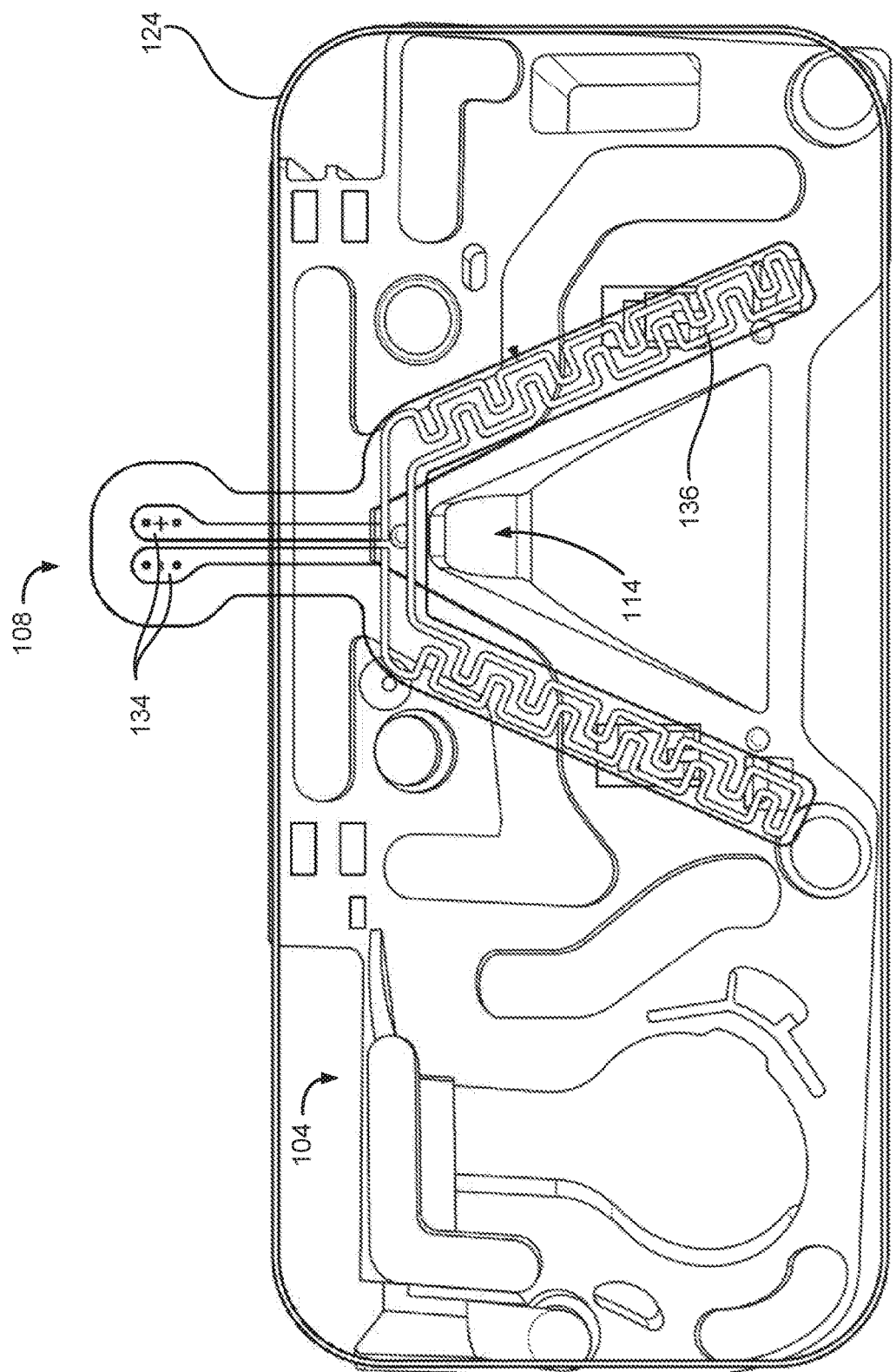
FIG. 6 illustrates another perspective front view of a bracket attached to an adhesive securing pad that includes a heater, in accordance with aspects of the present disclosure.

In some embodiments, the bracket 104 may be coupled to a heater 108 using the adhesive securing pad 124, as shown in FIGS. 6 and 7A-C. Referring specifically to FIG. 6, the heater 108 may be attached to the securing adhesive pad 124, and include input leads 134 and one or more resistive elements 136. The input leads 134 may be electrically connected to the lane departure warning system 102, as well as other hardware on the vehicle, such as a vehicle electrical harness, a power outlet, and/or any other suitable hardware. Although shown as extending beyond the perimeter of the adhesive securing pad 124, the entire heater 108, including the input leads 134, may be contained within, and positioned anywhere inside the perimeter of the adhesive securing pad 124. As such, the bracket 104 or adhesive securing pad 124 may provide access to the input leads 134 through various openings therein. In addition, the resistive element(s) 136 may have any shapes, and can be positioned anywhere within the perimeter of the adhesive securing pad 124. As shown in FIG. 6, in some applications, it may be advantageous to position the resistive element(s) 136 generally about or in proximity to the opening 114 in the bracket 104 (e.g., less than 5 cm away) in order to provide heat to remove frost or moisture from surfaces along the line of sight of the camera.

Figure 7A:
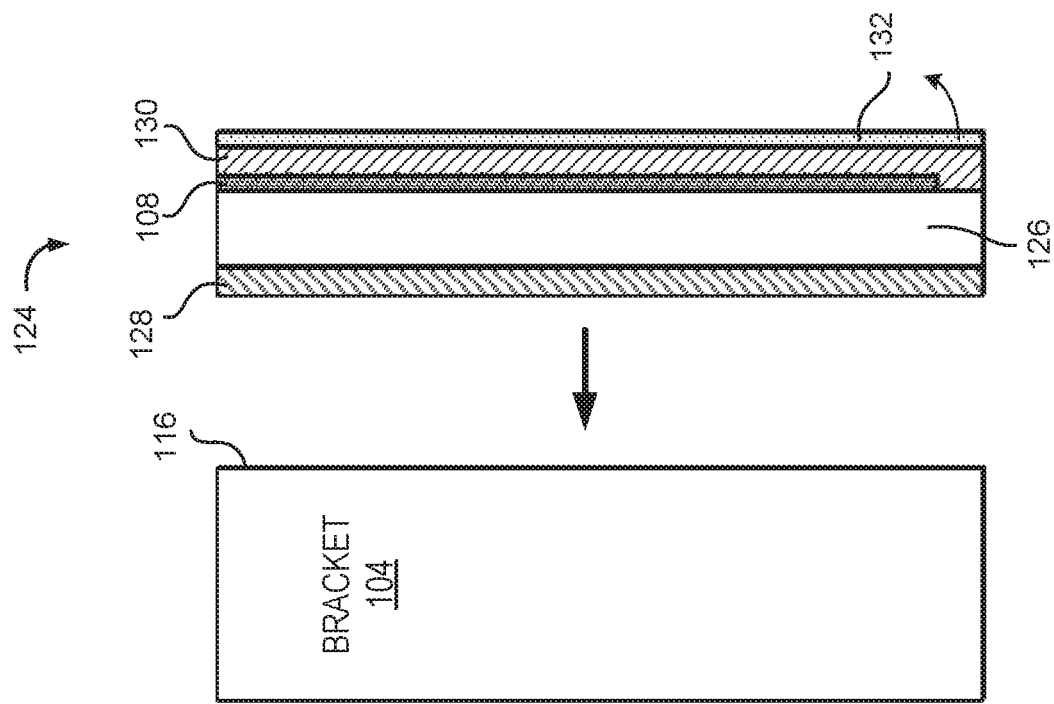
FIG. 7A illustrates one embodiment of a heater attached to an adhesive securing pad, in accordance with aspects of the present disclosure.
Figure 7B:
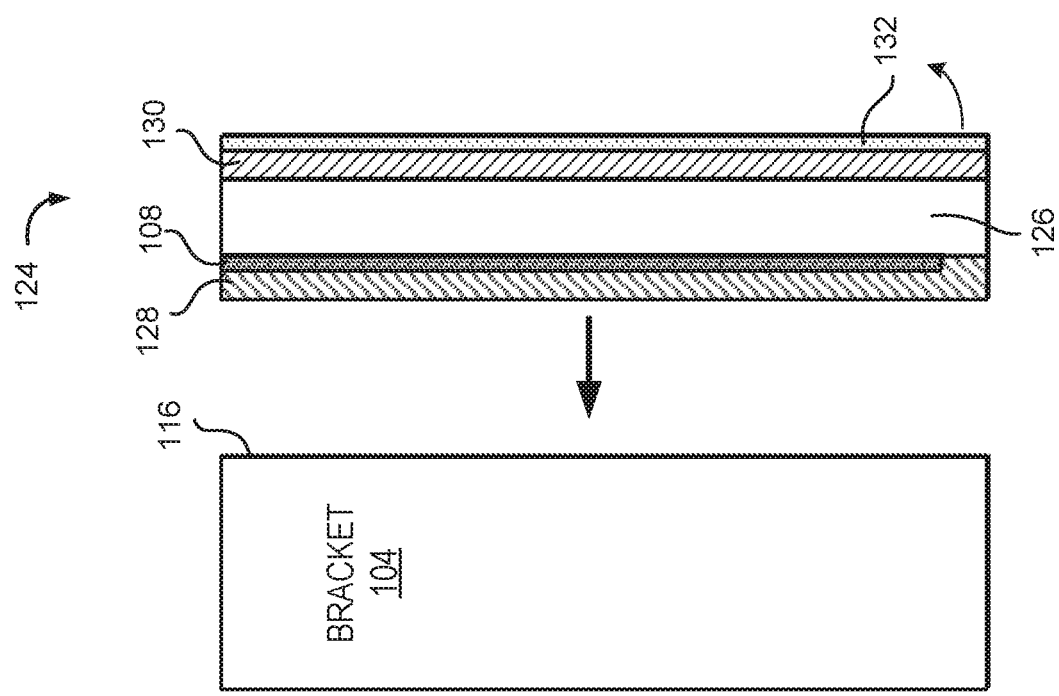
FIG. 7B illustrates another embodiment of a heater attached to an adhesive securing pad, in accordance with aspects of the present disclosure.

In some embodiments, the heater 108 may be positioned directly on the substrate 126, on the first side of the adhesive securing pad 124 to allow the heater 108 to provide heat close to the bracket 104, as shown in FIG. 7A. The heater 108 may then be covered with the first adhesive layer 128 as shown. Alternatively, the heater 108 may be applied to the first adhesive layer 128 and then covered with thin foam gap-filling adhesive. In other embodiments, the heater 108 may be positioned directly on the substrate 126, on the second side of the adhesive securing pad 124, as shown in FIG. 7B. This allows the heater 108 to provide heat close to the surface to which the bracket 104 is attached (e.g., a windshield). Similarly, the heater 108 may be also applied to the second adhesive layer 130 and then covered with thin foam gap-filling adhesive. In some alternatives, the heater 108 may be embedded in the first adhesive layer 128 or the second adhesive layer 130. In yet other embodiments, as shown in FIG. 7C, the heater 108 may also be embedded or incorporated into the substrate 126 of the adhesive securing pad 124.

Figure 7C:
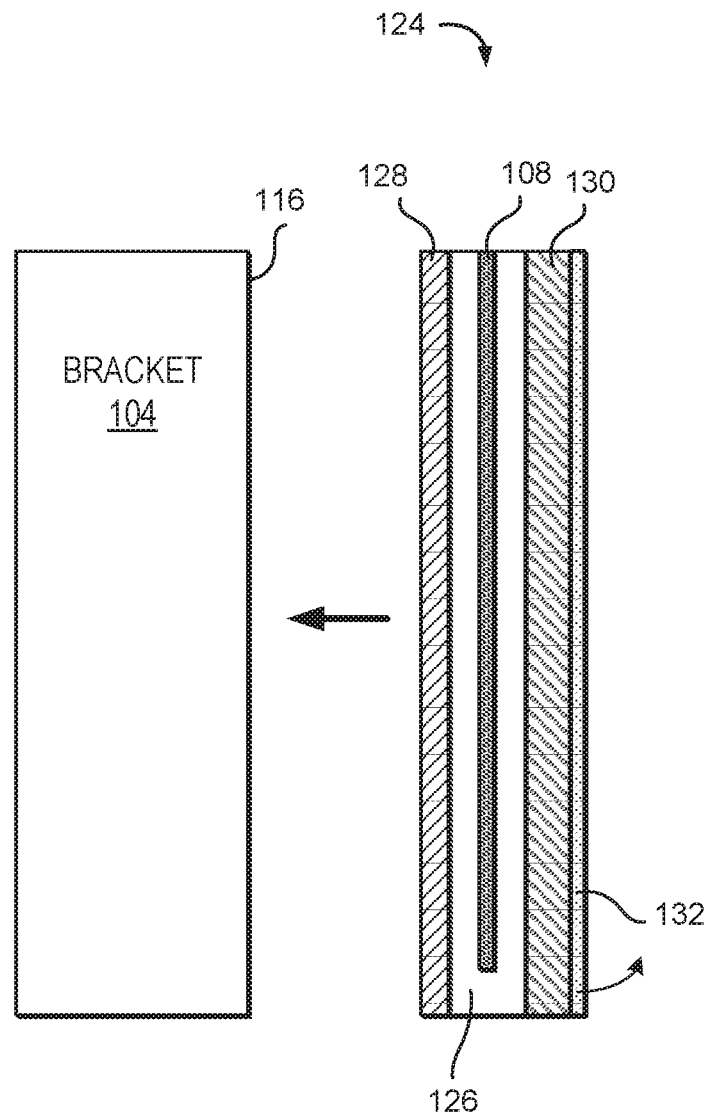
FIG. 7C illustrates yet another embodiment of a heater incorporated into an adhesive securing pad, in accordance with aspects of the present disclosure.

The adhesive securing pad 124 shown in FIGS. 7A-7C may be formed using a variety of methods. For instance, in one non-limiting example, the adhesive securing pad 124 may be formed by printing a conductive ink on a plastic, or other type of substrate, and the substrate-ink layer may then be covered on both sides with various adhesive layers. In another non-limiting example, at least a portion of an electrical wire, or other electrical circuitry, may be laminated to produce a substrate 126 incorporating a heater 108. The substrate-wire layer may then be covered on both sides with various adhesive layers, as described.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

The invention claimed is:

1. A lane departure warning system that is configured to be securely coupled to a portion of a vehicle, the lane departure warning system comprising:
   a bracket that is configured to securely retain a camera assembly;
   a securing adhesive pad attachable to the bracket, and configured to securely couple the lane departure warning system to the portion of the vehicle; and
   a heater that is attached to the securing adhesive pad, and configured to provide heat to at least a portion of the lane departure warning system or the portion of the vehicle.

2. The lane departure warning system of claim 1, wherein the bracket further comprises a retention area configured to hold a camera assembly on a rear side of the bracket.

3. The lane departure warning system of claim 2, wherein the bracket further comprises an opening that is recessed from a front surface on a front side the bracket, the opening connecting the front side and rear side of the bracket.

4. The lane departure warning system of claim 3, wherein the bracket further comprises at least one expanding inclined plane that extends from the opening and forms an angle relative to the front surface of the bracket that is in a range between approximately 5° and approximately 45°.

5. The lane departure warning system of claim 1, wherein the securing adhesive pad comprises:
   a substrate;
   a first adhesive layer on a first side of the substrate that is configured to secure the securing adhesive pad to the bracket; and
   a second adhesive layer on a second side of the substrate that is configured to secure the lane departure warning system to the vehicle.

6. The lane departure warning system of claim 5, wherein the heater is positioned proximate to the first adhesive layer of the securing adhesive pad.

7. The lane departure warning system of claim 5, wherein the heater is positioned proximate to the second adhesive layer of the securing adhesive pad.

8. The lane departure warning system of claim 5, wherein the heater is embedded in the substrate of the securing adhesive pad.

9. The lane departure warning system of claim 5, wherein the securing adhesive pad further comprises a protective layer positioned proximate to the second adhesive layer.

10. A lane departure warning system that is configured to be securely coupled to a portion of a vehicle, the lane departure warning system comprising:
    a bracket that is configured to securely retain a camera assembly; and
    a securing adhesive pad attachable to the bracket that comprises:
      a substrate;
      a first adhesive layer on a first side of the substrate that is configured to secure the securing adhesive pad to the bracket; and
      a second adhesive layer on a second side of the substrate that is configured to secure the lane departure warning system to the vehicle.

11. The lane departure warning system of claim 10 further comprising a heater that is attached to the securing adhesive pad, and configured to provide heat to at least a portion of the lane departure warning system or the portion of the vehicle.

12. The lane departure warning system of claim 11, wherein the bracket further comprises an opening that connects the front side and rear side of the bracket.

13. The lane departure warning system of claim 12, wherein the opening is recessed from a front surface on a front side the bracket.

14. The lane departure warning system of claim 12, wherein the bracket further comprises at least one expanding inclined plane that extends from the opening and forms an angle relative to the front surface of the bracket that is in a range between approximately 5° and approximately 45°.

15. The lane departure warning system of claim 12, wherein the heater comprises one or more resistive elements positioned in proximity to the opening.

16. The lane departure warning system of claim 11, wherein the heater is positioned proximate to the first adhesive layer of the securing adhesive pad.

17. The lane departure warning system of claim 11, wherein the heater is positioned proximate to the second adhesive layer of the securing adhesive pad.

18. The lane departure warning system of claim 11, wherein the heater is embedded in the substrate of the securing adhesive pad.

\* \* \* \* \*